United States Patent [19]

Buettiker

[11] Patent Number: 5,318,620
[45] Date of Patent: Jun. 7, 1994

[54] SPOUT BOWL FOR MOLTEN GLASS FEEDER

[75] Inventor: Paul Buettiker, Bloomfield, Conn.

[73] Assignee: Emhart Glass Machinery Investments Inc., Wilmington, Del.

[21] Appl. No.: 61,839

[22] Filed: May 14, 1993

Related U.S. Application Data

[63] Continuation of Ser. No. 723,163, Jun. 28, 1991, abandoned.

[51] Int. Cl.$^5$ .............................................. C03B 7/084
[52] U.S. Cl. ........................................ 65/325; 65/328; 65/330
[58] Field of Search ................ 65/328, 329, 330, 331, 65/332, 324, 221, 180, 129, 325

[56] References Cited

U.S. PATENT DOCUMENTS

| | | | |
|---|---|---|---|
| 1,869,921 | 8/1932 | Soubier | 65/332 |
| 1,870,210 | 8/1932 | Soubier | 65/180 |
| 2,493,260 | 1/1950 | Paquette | 65/180 |
| 2,654,184 | 10/1953 | Peiler | 65/180 |

*Primary Examiner*—Joye L. Woodard
*Attorney, Agent, or Firm*—Spencer T. Smith

[57] ABSTRACT

A spout bowl assembly having a non-rotating spout tube and a spout bowl defining a spiral volume about the tube for establishing uniform radial velocity of molten glass through the throat between the horizontal bottom surface of the tube and the horizontal portion of the bottom wall of the spout bowl.

5 Claims, 4 Drawing Sheets

SPOUT BOWL FOR MOLTEN GLASS FEEDER

This is a continuation of co-pending application Ser. No. 07/723,163 filed on Jun. 28, 1991, now abandoned.

The present invention relates to feeders for molten glass and more particularly to spout bowls for receiving molten glass and supplying tightly controlled amounts to the molds of a container forming machine located downstream and below the spout.

In a conventional feeder such as is shown in U.S. Pat. No. 4,554,000 molten glass is supplied to a spout bowl which has a circular hole at the bottom. A cylindrical tube overlies the spout bowl and a selected clearance can be established between the bottom of the tube and the surface of the spout bowl around the opening to control glass flow from the spout bowl. To achieve uniform tube wear and to improve the uniformity of the temperature of the molten glass and its flow, either the tube is rotated or paddles are rotated within the spout bowl (see U.S. Pat. No. 4,717,412).

It is accordingly an object of the present invention to achieve uniform temperature and flow of the molten glass from the orifice ring at the bottom of the spout bowl without rotating the tube or internal paddles whereby the driving mechanism for the tube or paddles can be eliminated.

Other objects and advantages of the present invention will become apparent from the following portion of this specification and from the accompanying drawings which illustrates in accordance with the mandate of the patent statutes a presently preferred embodiment incorporating the principles of the invention.

Referring to the drawings.

Figure 1:
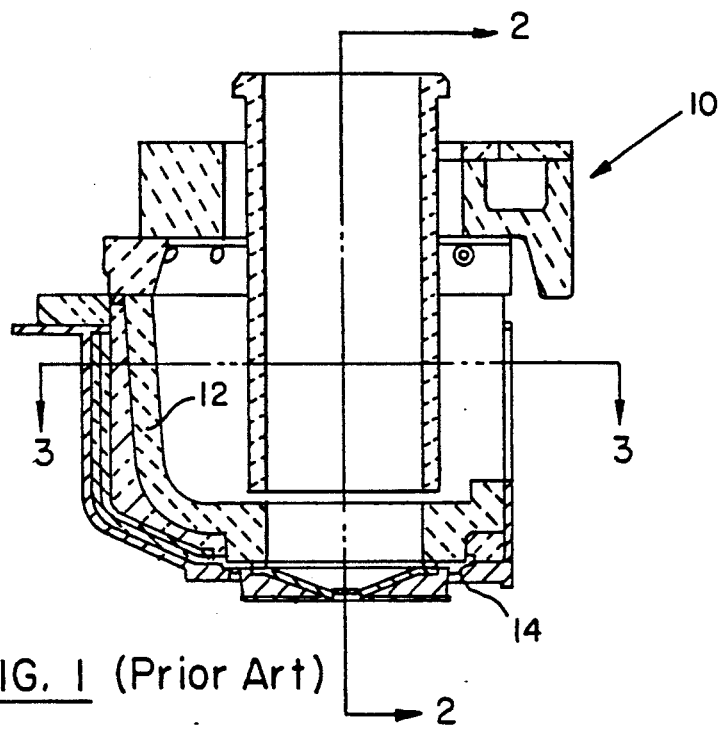
FIG. 1 is a side cross sectional view of a prior art spout bowl assembly.

A conventional spout bowl assembly 10 is made up of a refractory bowl 12 which rests on a cast iron bracket 14 supported on a cast iron housing 16. Between the refractory bowl and the housing are layers of loose insulation 18 and microtherm 20. The housing 16 is secured to a support plate 22 and a roof structure including mullite blocks 24 and firebricks 26 closes the top except for an opening 28 through which a refractory tube 30 extends. The refractory tube has the same inner diameter as the inner diameter of the discharge hole 32 in the refractory bowl 12 and the rate of flow from the bowl through the throat defined between the bottom of the tube and the bowl can be controlled by adjusting the separation between the bowl and the bottom 35 of the tube. Discharged molten glass passes through an orifice plate 34.

Figure 2:
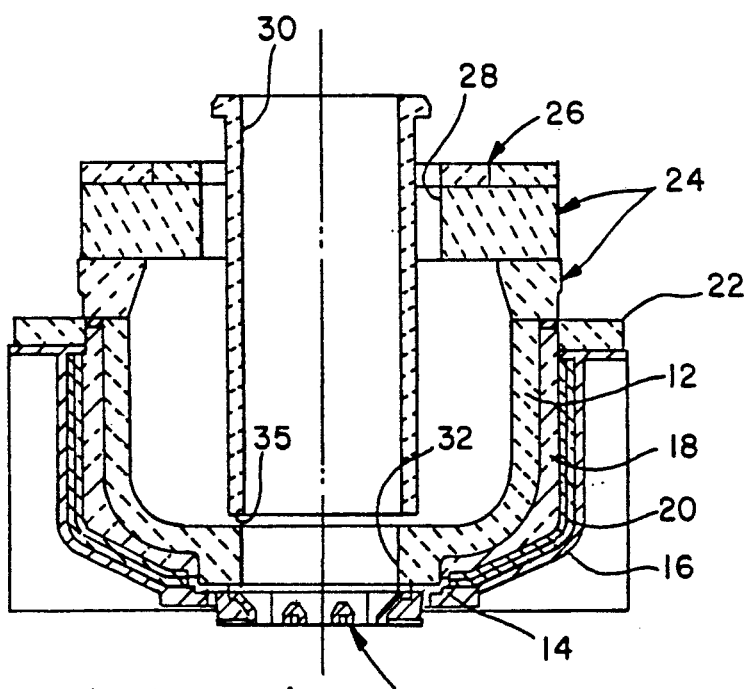
FIG. 2 is a view of the prior art spout bowl assembly shown in FIG. 1 taken along the lines 2—2 of FIG. 1.
Figure 3:
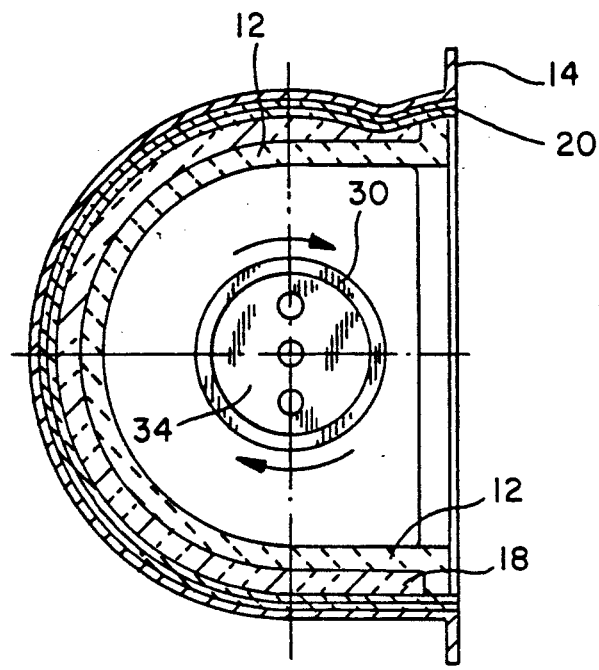
FIG. 3 is a view of the prior art spout bowl assembly shown in FIG. 2 taken along the lines 3—3 of FIG. 1.
Figure 4:
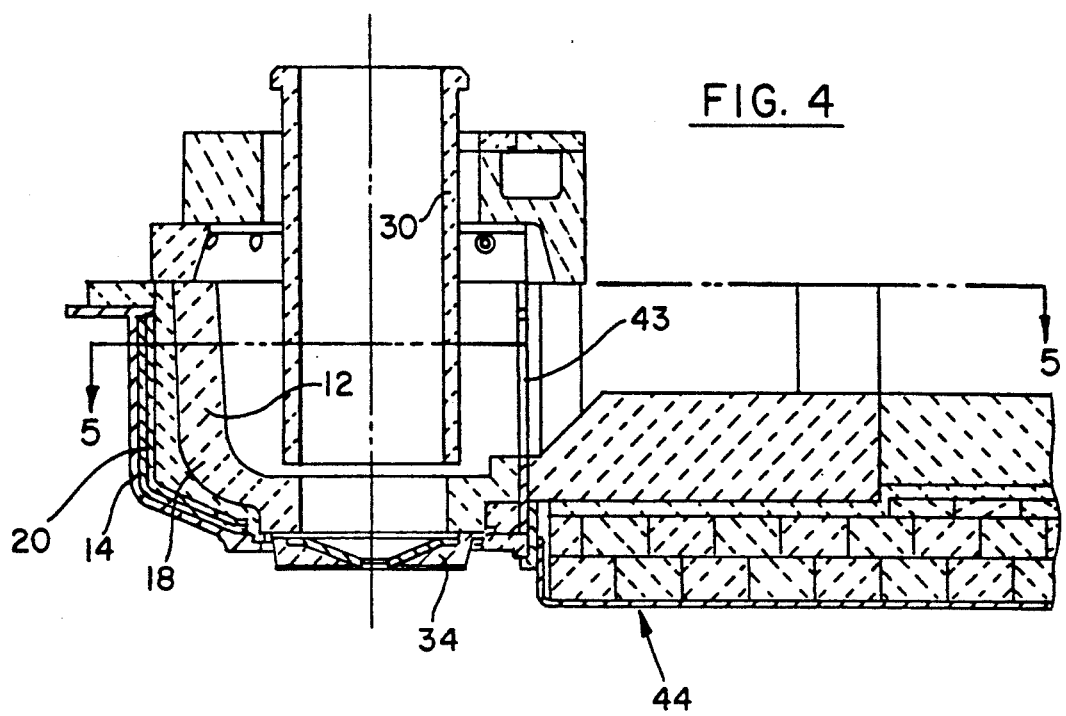
FIG. 4 is a view similar to that of FIG. 1 of a spout bowl assembly made in accordance with the teachings of the present invention receiving molten glass from a forehearth.

As can be seen from FIGS. 1 to 3 the front portion of the bowl remote from the forehearth (not shown) is substantially cylindrical and the back portion joining this cylindrical portion to the forehearth 90° clockwise or counterclockwise from the forehearth centerline has parallel sides. Molten glass flows into the bowl flowing both clockwise and counterclockwise. The tube rotates either direction to distribute heat more uniformly and to achieve uniform tube wear at the bottom surface 35.

The inventive spout bowl assembly (FIGS. 4–7) has a stationary (non-rotating) vertical tube and a spiral spout bowl design. The spout bowl is open at the back from a location substantially at the centerline 40 of the forehearth and spout bowl to one side 42 of the spout bowl. The forehearth includes a transitioning section 44 which reduces the width of the flow channel 46 from its original width to the width of the spout bowl inlet 43 and the transitioning section is tapered at the centerline so that molten glass will be directed clockwise around the stationary tube 30.

Figure 5:
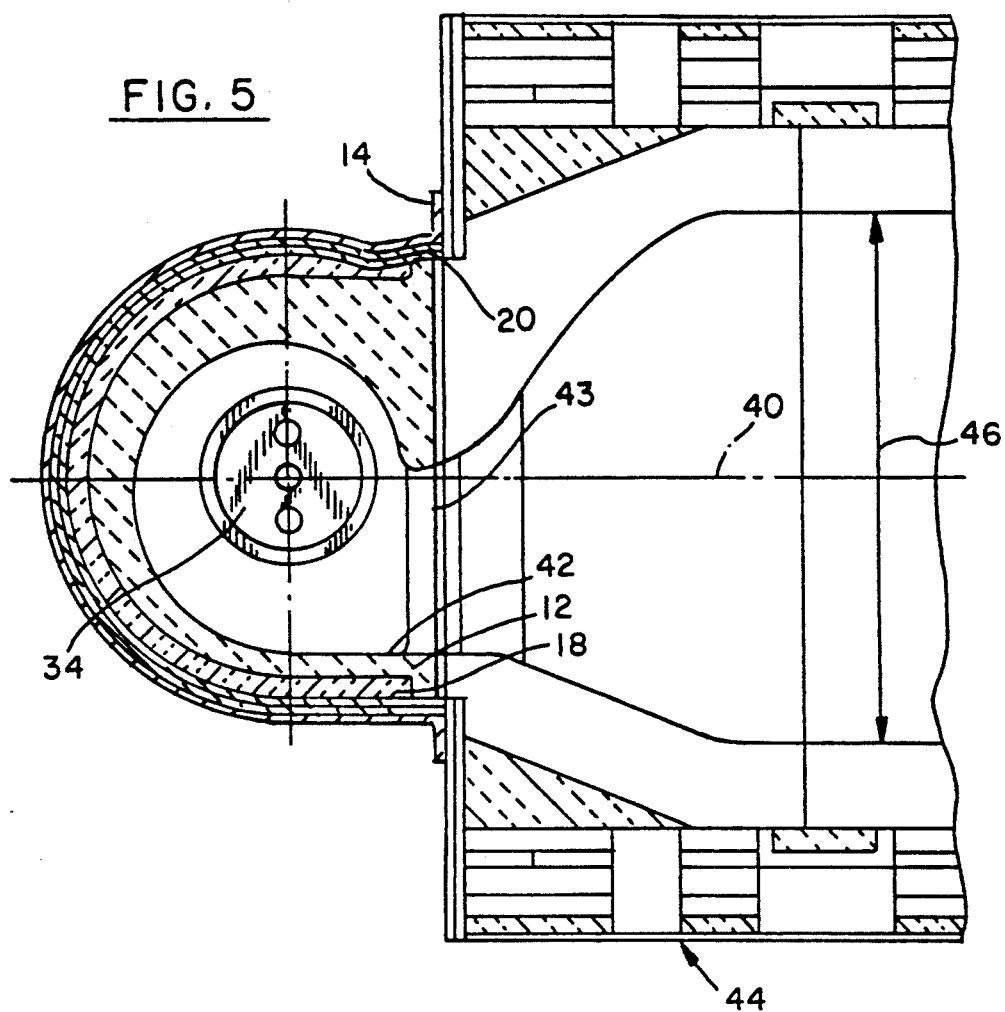
FIG. 5 is a view of the spout bowl assembly illustrated in FIG. 4 taken along the lines 5—5 thereof.
Figure 6:
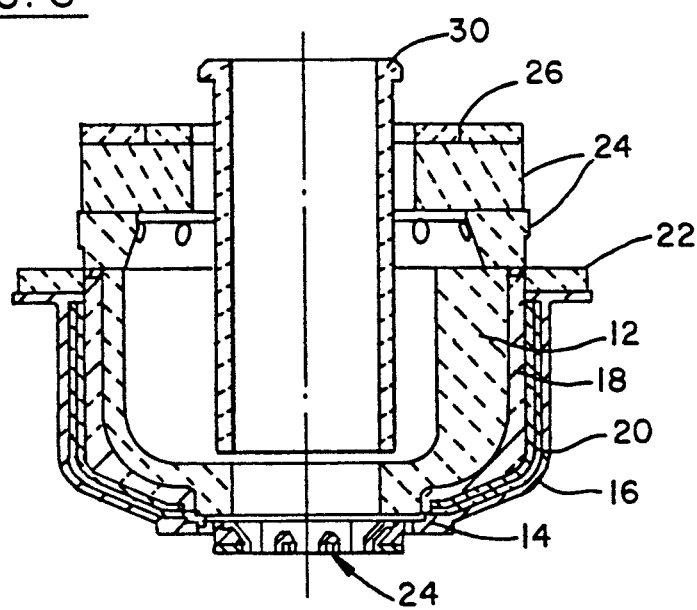
FIG. 6 is a view of the spout bowl assembly illustrated in FIG. 5 taken along the lines 6—6 thereof.
Figure 7:
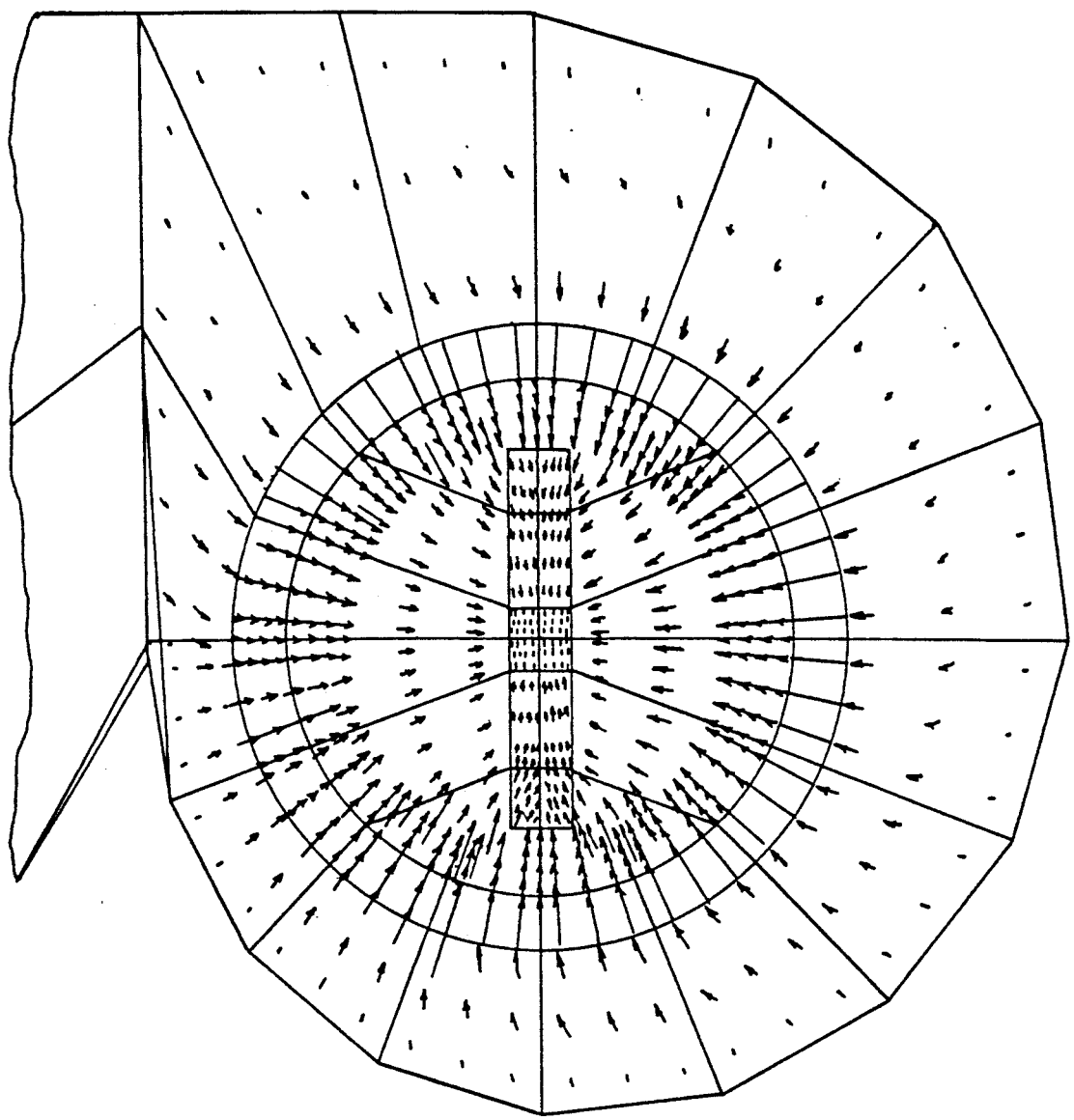
FIG. 7 is a schematic representation of the distribution of velocity vectors at the mid plane of the tube gap.

As can be seen from FIG. 5, the initial potion 42 of the outside wall of the spout bowl is straight, parallel to and between the forehearth centerline and the adjacent forehearth side wall. Beginning at the location 90° clockwise from the forehearth centerline about the center point, i.e., the discharge opening or tube axis, the vertical surface of the bowl is changed. The radius of the inner vertical surface of the spout bowl substantially uniformly decreases in the clockwise direction. This design provides a positively guided working flow pattern in the region between the direction. This novel design provides a positively guided working fluid flow pattern in the region between the spout tube and top surface of the horizontal bottom of the bowl which it overlies. In this throat region as can be seen from FIG. 7, as a result of this new design, the flow vectors of the molten glass as it flows inwardly through the annular exit passage defined between the spout tube and the top surface of the horizontal bottom of the bowl which it overlies into the discharge hole are pointed in the radial direction (there is no circulatory velocity component, i.e., there is no vorticular flow in the molten glass as it flows through this annular exit passage) and are of uniform length. As a result, while it may be rotated for other reasons, this new design does not require tube rotation for uniform glass distribution and flow. This spout bowl being physically interchangeable with the prior art spout bowl may be retrofitted into a feeder where the tube rotates.

I claim:

1. A spout bowl assembly for receiving molten glass comprising a spout bowl including:
  a side wall having an inside substantially vertical surface,
  a bottom wall having a horizontal inside surface portion having a vertically extending cylindrical discharge hole therein defining a vertical central axis, and
  an opening in said side wall through which molten glass will flow into the spout bowl, and
  a vertically extending cylindrical non rotating tube coaxial with said axis and having an annular flat horizontal bottom surface located spaced from and above said horizontal surface portion of said bottom wall,
  the inside surface of said side wall defining with said cylindrical tube a spiral extending substantially around said cylindrical tube having a radius substantially uniformly decreasing in the direction of flow into the spout bowl.

2. A spout bowl assembly according to claim 1, wherein said spiral extends about 270°.

3. A spout bowl assembly according to claim 2, wherein said side wall opening has opposed vertical sides and said side wall inside surface at the narrow end of said spiral ends at one of said vertical sides.

4. A spout bowl assembly according to claim 3, wherein said inside side wall surface is substantially vertical.

5. A spout bowl assembly according to claim 3, wherein said side wall inside surface includes a straight portion extending between the other one of said side wall opening vertical sides and the sidewall inside surface at the other end of said spiral.

* * * * *